United States Patent
Maufras et al.

(10) Patent No.: US 11,885,614 B2
(45) Date of Patent: Jan. 30, 2024

(54) OPTICAL ROTARY SENSOR

(71) Applicant: OSI Optoelectronics, Inc., Hawthorne, CA (US)

(72) Inventors: Jean-Pierre Maufras, Pomona, CA (US); Michael John Frick, Newbury Park, CA (US); Michel Chiasson, Granby (CA); Teodor Petrea, Loungueuil (CA)

(73) Assignee: OSI Optoelectronics, Inc., Hawthorne, CA (US)

( * ) Notice: Subject to any disclaimer, the term of this patent is extended or adjusted under 35 U.S.C. 154(b) by 451 days.

(21) Appl. No.: 17/114,273

(22) Filed: Dec. 7, 2020

(65) Prior Publication Data

US 2022/0178682 A1  Jun. 9, 2022

(51) Int. Cl.
  *G02B 26/08*  (2006.01)
  *G01D 5/30*  (2006.01)
  *G01B 11/26*  (2006.01)

(52) U.S. Cl.
  CPC .............. *G01B 11/26* (2013.01); *G01D 5/30* (2013.01); *G02B 26/0875* (2013.01)

(58) Field of Classification Search
  CPC .......... G01D 5/3473; G01D 5/36; G01D 5/26; G01D 5/30; G02B 26/0875; G01B 11/26
  See application file for complete search history.

(56) References Cited

U.S. PATENT DOCUMENTS

| 3,323,120 A | 5/1967 | Uehlin | |
|---|---|---|---|
| 4,902,885 A * | 2/1990 | Kojima | G01D 5/366 250/214 PR |
| 5,272,335 A * | 12/1993 | Nakaho | G01D 5/34784 250/214 PR |
| 5,973,320 A * | 10/1999 | Maruyama | G01D 5/3473 250/214 PR |
| 6,800,843 B2 | 10/2004 | Horton | |
| 7,034,282 B2 | 4/2006 | Oka | |
| 2005/0133696 A1 | 6/2005 | Orrico | |
| 2013/0144553 A1 | 6/2013 | Omata | |

FOREIGN PATENT DOCUMENTS

EP     3591346 A1    1/2020

OTHER PUBLICATIONS

Interntaional Search Report for PCT/US2021/072766, dated Feb. 23, 2022.
Written Opinion of the International Searching Authority for PCT/US2021/072766, dated Feb. 23, 2022.

* cited by examiner

*Primary Examiner* — William J Carter
(74) *Attorney, Agent, or Firm* — Novel IP

(57) ABSTRACT

Embodiments of the present specification provide an apparatus for detecting an angle of rotation of a rotating member. A light source emits light rays which are conditioned by a light conditioner to control a light beam geometry and emission pattern of the light rays. The conditioned rays are incident on an optical disk that emits refracted rays in form of a light spot on an optical detector. The optical disk rotates in synchronization with the rotating member. The optical detector uses position of the light spot to output an analog signal continuous and ratio-metric to the angle of rotation of the rotating member.

24 Claims, 12 Drawing Sheets

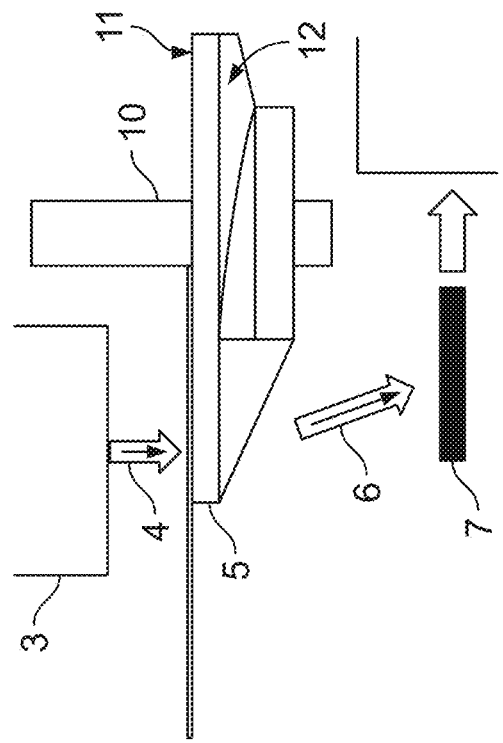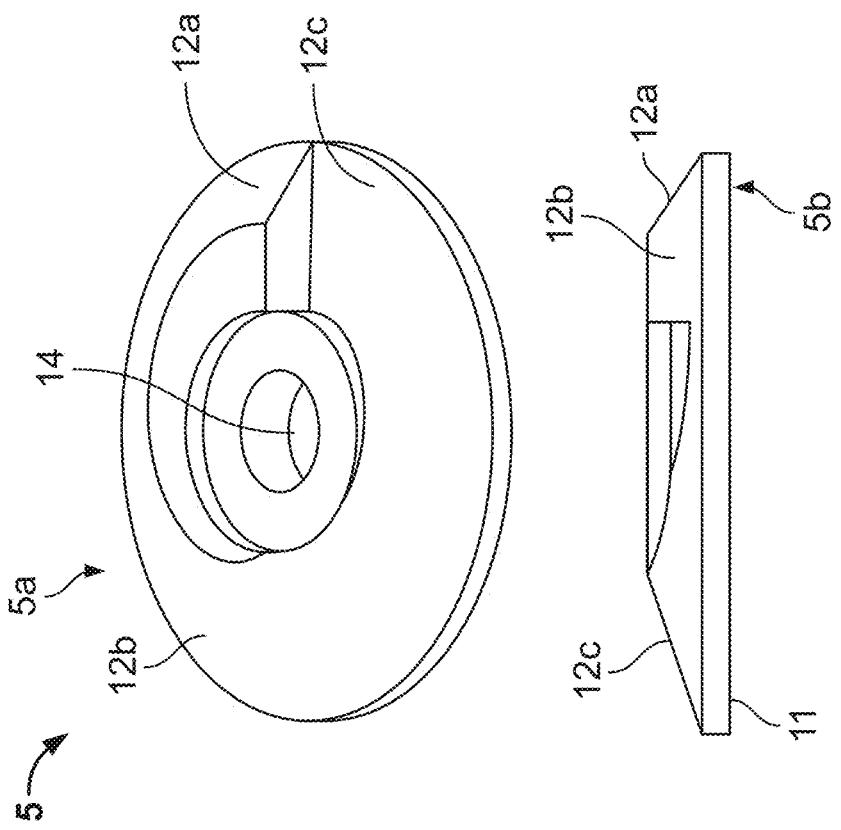
11: Entry surface
12a: Exit surface at 355 degree disk rotation
12b: Exit surface at 180 degree disk rotation
12c: Exit surface at 5 degree disk rotation
FIG. 6A
FIG. 6B

FIG. 6D

OPTICAL ROTARY SENSOR

FIELD

The present specification relates generally to rotational position detection. More particularly, the present specification relates to generating an output signal from a photodetector using an optical transducer.

BACKGROUND

Optical sensors for determining rotational position, such as those of a rotating shaft, are known. A light emitting element and an optical detector are positioned on either side of a disk that is mounted on the rotating shaft. An angular position of the disk and, by extension, the angular position of the rotating shaft is determined from the detected light signal. Conventionally, the disk includes a slit. In operation, a light source (either multiple light sources or a diffuse light source) shines on the disk, passes through the slit and hits the optical detector. Depending on where the light passes through the slit and hits the detector, the rotational position of the disk at that time is determined.

U.S. Pat. No. 5,272,335, titled "Eccentricity-compensated position detecting apparatus having an identifying transparent slit", discloses "an angle of rotation detecting apparatus comprising: a rotary board mounted on a rotary shaft, said rotary board having a center of rotation and a ring shaped reference transparent slit having a predetermined radius, and a detecting transparent slit extended in a direction of rotation of said rotary board in such a manner that a distance between said detecting transparent slit and the center of rotation of said rotary board changes continuously; stationary light emitting means for projecting light through said reference transparent slit and said detecting transparent slit; stationary light receiving means for receiving said light projected through said reference transparent slit and projected through said detecting transparent slit to detect light receiving positions in a direction along a radius of said rotary board and to output light reception signals in accordance with said reference transparent slit and said detecting transparent slit, respectively; and arithmetic means for calculating an angle of rotation of said rotary board in accordance with said light reception signals outputted by said light receiving means."

German Patent No. DE102009005536, titled "Rotational angle sensor for contactless determination of rotational angle of rotational axis, comprises optical radiation source and detector, where shading structure is arranged in beam path between radiation source and detector", a rotation angle sensor for non-contact determination of the rotation angle of a rotation axis, comprising an optical radiation source and a detector, wherein in the beam path between the radiation source and the detector, a shading structure is arranged whose position varies with the axis of rotation and associated with the rotation angle of the rotation axis in that the shading structure is at least partially illuminated by the radiation of the radiation source as a function of the rotation angle of the rotation axis and is imaged and/or projected onto the detector."

FIG. 1 illustrates an exemplary detector arrangement 100 known in the prior art. The figure shows a side elevation view 102a and a cross-sectional view 102b of the detector arrangement 100. A light emitting element 104 emits light 106, which is received by a light receiving element 108. The light receiving element 108 has an overall external diameter ($D_{ext}$). Elements 104 and 108 are positioned on either side of an optical disk 112 mounted on a rotary shaft 110. Optical disk 112 is supported by a flange 114 around the shaft 110 and between the elements 104 and 108. Flange 114 has a diameter $D_{int}$, while a maximum optical disk 112 diameter is shown as y. $D_{ext}$ is greater than y, and y is greater than $D_{int}$. An opaque layer covers most of the surface of optical disk 112, and only a partial spiral slit 116 enables light 106 to pass through the disk 112. The slit 116 is configured so that a maximum footprint 118 of x distance is provided for elements 104 and 108. In embodiments, the maximum allowed footprint is within a difference of y and $D_{int}$. A position sensing detector 120 mounted on the element 108 detects the angular position of the rotary board, or angle of rotation thereof, from a light reception signal outputted by the detector 120 and processed by a signal processor, within the allowed footprint of x distance. The signal processor therefore generates a light reception signal according to the position of light 106 on detector 120, indicating the angle of rotation of the optical disk 112.

Detection accuracy is dependent on the resolution of light received by the detector. Resolution is a function of the size of the detected spot and the distance that the detected spot can move. The present methods of detection are limited in terms of the resolution that may be achieved by the detector. If the detected spot is large and is translated (moves up to) a limited distance (x), then detection of rotatory movement is also limited, and the resolution is therefore limited. If, however, the detected spot is small and it can move over a relatively large range of distances, then the resolution is expected to be relatively improved. In a conventional slit approach such as of FIG. 1, the location of the spot of light is limited to the size (y) of the disk 112 since light passes straight through the slit 116 positioned on the disk 112. In addition, the spot of light is generated from a diffused light source, so it is not as small as it can be, and thus, not optimal. In a conventional shading structure that is designed to vary the intensity of light that reaches the detector as a function of the angle of rotation, the angular resolving power is limited by the achievable rate of change of the shading structure as a function of the angle of rotation.

There is therefore a need for optical systems that provide a greater resolution while sensing rotatory displacement.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses an apparatus for detecting an angle of rotation of a rotating member, the apparatus comprising: a light source for emitting light rays; a light conditioner configured to receive and condition the light rays emitted by the light source in order to control an emission pattern of the light rays, wherein the light conditioner is further configured to emit the conditioned light rays; an optical transducer with at least one refractive surface, wherein the optical transducer is coupled to the rotating member, wherein the optical transducer is configured to receive the conditioned light rays emitted by the light conditioner through its at least one refractive surface and to emit refracted rays in form of a light spot, and wherein the at least one refractive surface has a varying dimension that corresponds with the angle of rotation of the rotating member; and an optical detector configured to receive the light spot emitted from the optical transducer, wherein the optical detector is configured to output an analog signal based on a position of the light spot and wherein the analog signal is indicative of the angle of rotation of the rotating member.

Optionally, the at least one refractive surface comprises a first outer surface and a second outer surface and wherein the first outer surface is configured to receive the conditioned light rays and the second outer surface is configured to emit refracted light rays.

Optionally, the first outer surface is perpendicular to a direction of travel of the received conditioned light rays.

Optionally, the second outer surface is non-parallel to, and positioned opposite to, the first outer surface such that a volume between the first outer surface and second outer surface varies along a dimension of the at least one refractive surface.

Optionally, the volume between the first outer surface and second outer surface varies around a circumference of the at least one refractive surface.

Optionally, a varying thickness of the volume between the first outer surface and second outer surface defines a position of the light spot on the optical detector.

Optionally, an angle of the second outer surface, relative to the first outer surface, changes continuously along a dimension of the at least one refractive surface such that, when impinged by the conditioned light rays, the at least one refractive surface causes a continuous linear displacement of the light spot on the optical detector.

Optionally, the apparatus further comprises a light source drive circuitry.

Optionally, the apparatus further comprises a signal circuitry in electrical communication with the optical detector, wherein the signal circuitry is configured to provide a continuous voltage output corresponding to the light spot received by the optical detector and wherein the voltage output is representative of the angular position of the rotating member.

Optionally, the rotating member comprises a shaft assembly.

Optionally, the optical detector is configured to not contact the optical transducer or rotating member.

Optionally, the optical transducer is configured in a shape of a circular disk.

Optionally, the light conditioner comprises at least one of refractive optics or optical apertures.

Optionally, the light source comprises at least one of a point source light emitting diode (LED), a laser diode, or a vertical cavity surface emitting laser (VCSEL).

Optionally, the optical transducer comprises a center and wherein the optical transducer is at attached its center to the rotating member.

Optionally, the analog signal is continuous and ratio-metric to the angle of rotation of the rotating member.

Optionally, the at least one refractive surface has a varying thickness that corresponds with the angle of rotation of the rotating member.

Optionally, the at least one refractive surface has a varying width that corresponds with the angle of rotation of the rotating member.

Optionally, the at least one refractive surface has a varying material composition that corresponds with the angle of rotation of the rotating member.

In some embodiments, the present specification discloses an apparatus for detecting an angle of rotation of a rotating member, the apparatus comprising: a light source for emitting light rays; a light conditioner configured to receive and condition the light rays emitted by the light source in order to control an emission pattern of the light rays, wherein the light conditioner is further configured to emit the conditioned light rays; an optical transducer with at least one refractive surface, wherein the optical transducer is coupled to the rotating member, wherein the optical transducer is configured to receive the conditioned light rays emitted by the light conditioner through its at least one refractive surface and to emit refracted rays in form of a light spot, and wherein the at least one refractive surface has a varying thickness that corresponds with the angle of rotation of the rotating member; an optical detector configured to receive the light spot emitted from the optical transducer, wherein the optical detector is configured to output an analog signal based on a position of the light spot, wherein the analog signal is continuous and ratio-metric to the angle of rotation of the rotating member; and signal circuitry in electrical communication with the optical detector, wherein the signal circuitry is configured to provide a continuous voltage output corresponding to the light spot received by the optical detector and wherein the voltage output is representative of the angular position of the rotating member.

Optionally, the optical detector is configured to not contact the optical transducer or rotating member.

Optionally, the optical transducer is configured in a shape of a circular disk. Optionally, the light source comprises at least one of a point source light emitting diode (LED), a laser diode, or a vertical cavity surface emitting laser (VCSEL).

Optionally, the optical transducer comprises a center and wherein the optical transducer is at attached its center to the rotating member.

In some embodiments, the present specification discloses an apparatus for detecting an angle of rotation of a rotating member, the apparatus comprising: a light source for emitting light rays; a light conditioner configured to receive and condition the light rays emitted by the light source to control a light beam geometry and emission pattern of the light rays, the light conditioner emitting conditioned light rays; an optical disk with at least one refractive surface, the optical disk attached at its center to the rotating member, the optical disk configured for receiving the conditioned light rays emitted by the light conditioner and emitting refracted rays in form of a light spot; and an optical detector configured to receive the light spot emitted from the optical disk, wherein the optical detector uses position of the light spot to output an analog signal continuous and ratio-metric to the angle of rotation of the rotating member.

Optionally, the optical disk comprises a first surface and a second surface, wherein the first surface is configured to receive the conditioned light rays and the second surface is configured to exit the refracted rays.

Optionally, the first surface is perpendicular to the received conditioned light rays.

Optionally, the second surface is at an angle to the first surface, wherein the angle defines a position of the light spot on the optical detector.

Optionally, the angle of the second surface is configured to change continuously to a value which provides continuous linear displacement of the light spot on the optical detector.

Optionally, the apparatus further comprises a light source drive circuitry.

Optionally, the apparatus further comprises a signal circuitry configured to provide a continuous voltage output corresponding to the light spot received by the optical detector, wherein the voltage output represents the angular position of the rotating member.

Optionally, the rotating member comprises a shaft assembly.

Optionally, the optical detector is a non-contact optical detector.

Optionally, the optical disk is configured in the shape of a circular disk.

Optionally, the light conditioner comprises at least one of refractive optics and optical apertures.

Optionally, the light source comprises one of a point source light emitting diode (LED), a laser diode, and a vertical cavity surface emitting laser (VCSEL).

The aforementioned and other embodiments of the present specification shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 6A is a schematic diagram illustrating details of the optical disk shown in FIG. 2, based on optical refractive principles, in accordance with some embodiments of the present specification;

FIG. 6B illustrates another view of the optical disk shown in FIG. 6A, in accordance with some embodiments of the present specification;

FIG. 6D illustrates additional views of the optical disk shown in FIGS. 6A, 6B and 6C, in accordance with some embodiments of the present specification;

DETAILED DESCRIPTION

The present specification is directed toward a non-contact optical rotary sensor. The optical sensor is configured to continuously output an analog signal that is ratio-metric to an angular position of a rotating shaft, which, in turn, is connected to a rotating member of any apparatus that may be monitored and controlled for its angular position. An optical disk creates a light spot on the surface of the optical detector or transducer that outputs a continuous analog signal proportional to the light spot position. The optical disk outputs a light spot whose position is a linear translation of the rotating shaft angle moving on the surface of the optical detector.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

Figure 2:
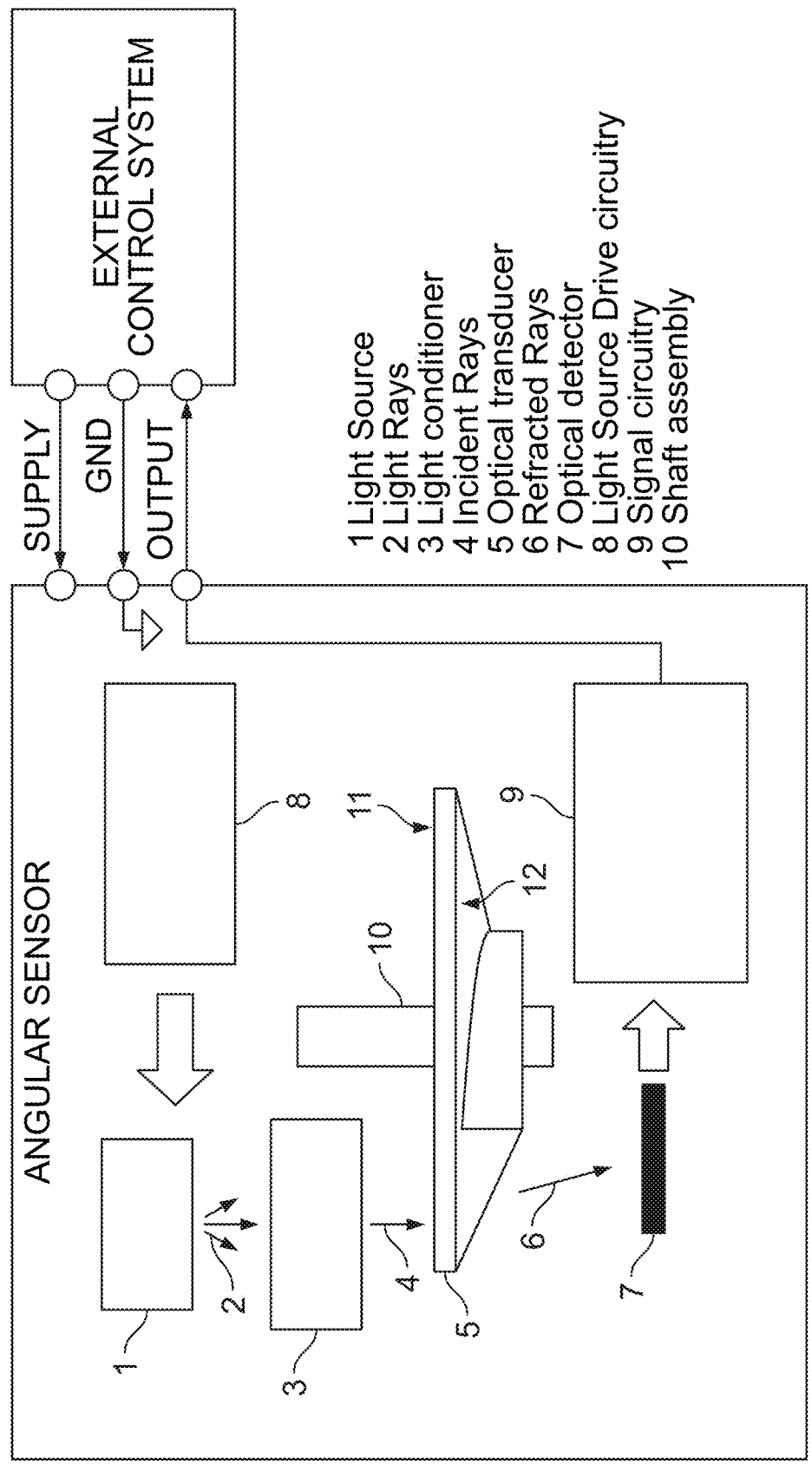
FIG. 2 illustrates a rotary sensor arrangement according to an exemplary embodiment of the present specification.

FIG. 2 illustrates a rotary sensor 200 according to an exemplary embodiment of the present specification. In embodiments, the sensor 200 is connected to a rotating shaft 10 of a rotating member that is monitored to determine its angular position. The sensor 200 includes a light source 1. The light source 1 can be a point source LED, a laser diode, or a vertical cavity surface emitting laser (VCSEL), or any other light source suitable for purposes of the present specification. The light source 1 generates light rays 2 that are received by a light conditioner 3. The light conditioner 3 controls the geometry and emission pattern of the received light rays to provide a low divergence, small waist light beam. The light beam divergence is such as to provide a light beam waist resulting in a light spot that is contained within the surface of a detector 7. The light conditioner 3 is configured with refractive optics, optical apertures, or a combination of both, to control the light beam geometry and emission pattern of the received light rays. In different embodiments, the light conditioner 3 is made from a lens that can be glass or plastic. Any lens/aperture combination providing a low divergence and uniform light spot that is contained within the top surface of the detector 7 may be used for the light conditioner 3.

It should be noted herein that the refractive surfaces or refractory surfaces, which in some embodiments are responsible for modulating the light rays, enable the modulation of light rays because of a varying thickness, width, material composition, or other dimension. In embodiments, an optical transducer has at least one refractive surface. In some embodiments, the at least one refractive surface has a varying dimension. Optionally, the at least one refractive surface has a varying thickness. Optionally, the at least one refractive surface has a varying width. Optionally, the at least one refractive surface has a varying material composition. Optionally, the varying dimension, such as thickness, width, or material composition corresponds with an angle of rotation of a rotating member.

In some embodiments, the at least one refractive surface comprises a first outer surface and a second outer surface wherein the first outer surface is configured to receive the conditioned light rays and the second outer surface is configured to emit refracted light rays. In some embodiments, the second outer surface is non-parallel to, and positioned opposite to, the first outer surface such that a volume between the first outer surface and second outer surface varies along a dimension of the at least one refractive surface. In some embodiments, the volume between the first outer surface and second outer surface varies around a circumference of the at least one refractive surface. In some embodiments, a varying thickness of the volume between the first outer surface and second outer surface defines a position of the light spot on the optical detector. In some embodiments, an angle of the second outer surface, relative to the first outer surface, changes continuously along a dimension of the at least one refractive surface such that, when impinged by the conditioned light rays, the at least one refractive surface causes a continuous linear displacement of the light spot on the optical detector.

The light conditioner 3 emits a controlled light beam 4 that is incident on an optical disk 5. In some embodiments, the optical disk 5 provides refractive optics for beam 4. The optical disk 5 is shaped in the form of a circular disk with two opposing surfaces: a first surface 11 (an entry surface) that receives the incident rays 4 from the light conditioner 3 and a second surface 12 (an exit surface) from where refracted rays 6 emerge out of the optical disk 5 and project a light spot 13 on an optical detector 7. First surface 11 and second surface 12 oppose each other. The optical disk 5 is connected to a rotating shaft assembly 10. In some embodiments, the rotating shaft 10 is positioned at the center of the circular optical disk 5. Therefore, the optical disk 5 rotates in unison with the rotation of the shaft 10. The optical disk 5 deflects incoming incident rays 4 by using refractive principles at the first surface 11 and second surface 12, while rotating around its center axis.

Figure 3:
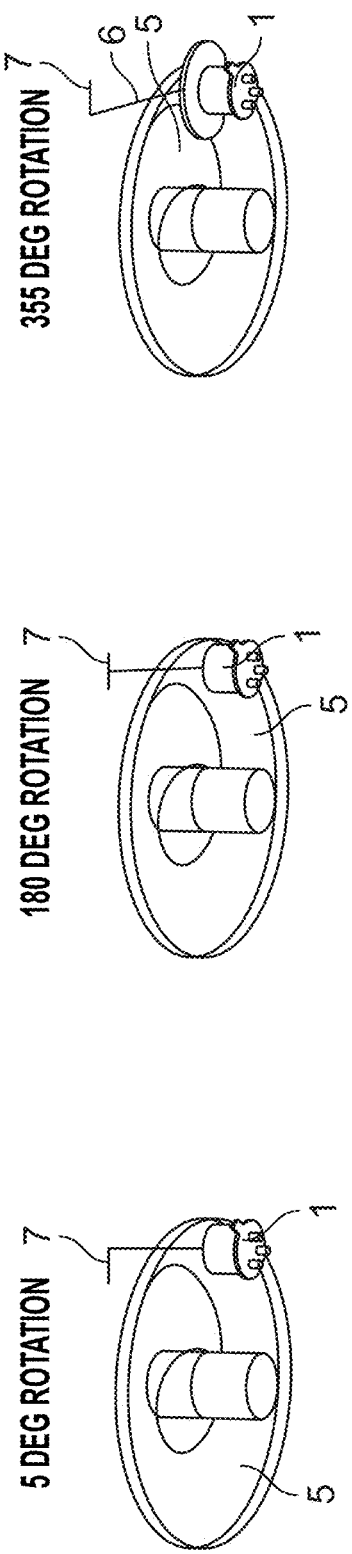
FIG. 3 illustrates light spot displacement over a position sensitive optical detector by way of example, in accordance with the present specification.
Figure 3:
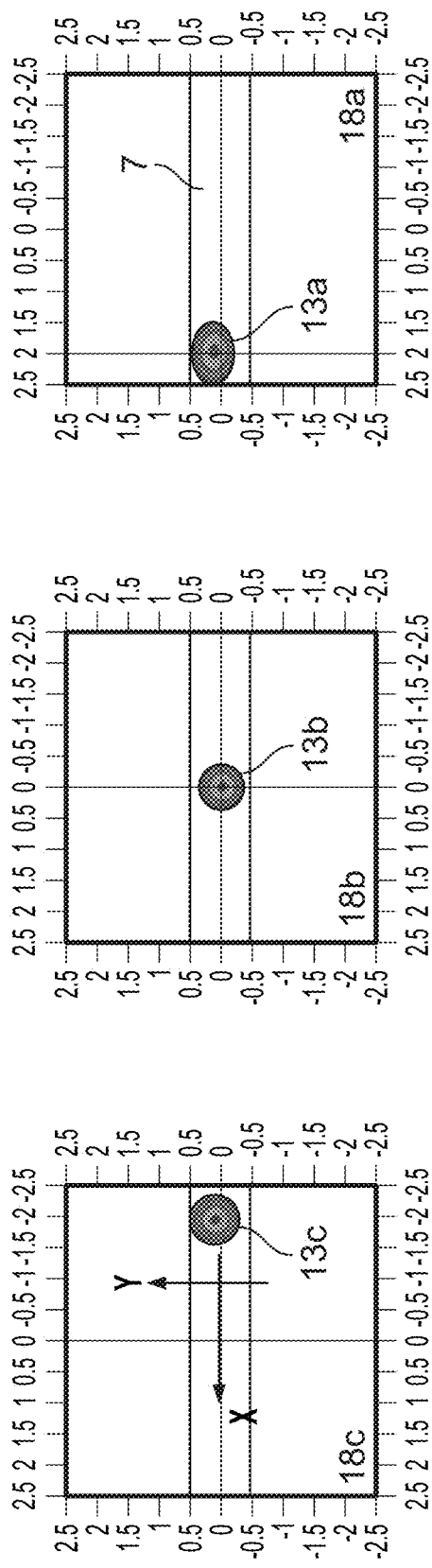

Referring now to FIG. 3 and FIG. 2 simultaneously, the optical detector 7 is configured to receive and detect a light spot 13 (shown as 13a, 13b, and 13c for different cases) created by the optical disk 5 and convert both the light spot 13 and information pertaining to a position of the light spot 13 to an electrical signal. A light source drive circuit 8 and a signal conditioning circuit 9, together with the detector 7, provide a 100% analog signal path. The "analog signal path" refers to the continuous nature of the electrical signal that is generated. As the optical disk 5 connected to the rotating shaft 10 rotates around a center axis, the light spot 13 follows a straight path that is ratio-metric to the angular position of the optical disk 5. The optical disk 5 therefore provides an "angular rotation to linear translation" function.

Referring again to FIG. 3, light spot displacement over a position sensitive optical detector 7 is illustrated by way of example. A graph 18a illustrates a light spot position 13a on the optical detector 7 when the optical disk 5, and by extension, the rotating member, has rotated by an angle of 355 degrees. A graph 18b illustrates a light spot position 13b on the optical detector 7 when the optical disk 5, and by extension the rotating member, has rotated by an angle of 180 degrees. A graph 18c illustrates a light spot position 13c on the optical detector 7 when the optical disk 5, and by extension the rotating member, has rotated by an angle of 5 degrees. The graphs 18a, 18b, and 18c, demonstrate the linear movement of the light spot along positions 13a, 13b, and 13c, on the optical detector 7.

Figure 4:
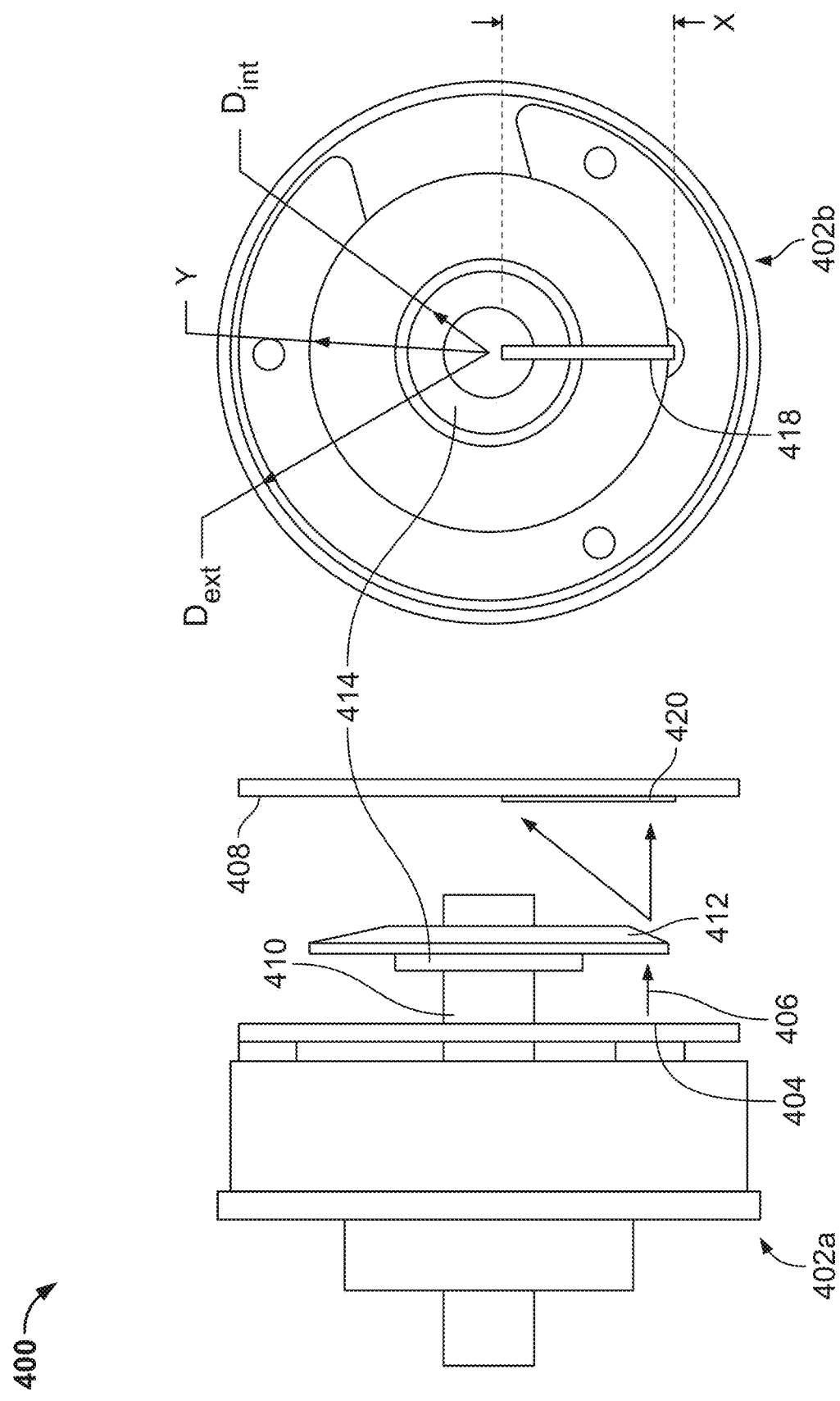
FIG. 4 illustrates a set of views of an exemplary detector arrangement, in accordance with some embodiments of the present specification.

FIG. 4 illustrates a set of views of an exemplary detector arrangement 400, in accordance with some embodiments of the present specification. The figure shows a side elevation view 402a and a cross-sectional view 402b of the detector arrangement 400. A light source 404 emits light rays 406. In embodiments, the light rays pass through a light conditioner (not shown), such as conditioner 3 of FIG. 2, which controls the light beam geometry and emission pattern of the received light rays. The light rays 406 emerging from the light conditioner are received by a light receiving element 408. The light receiving element 408 has an overall external diameter ($D_{ext}$). In embodiments, element 408 is a printed circuit board (PCB) upon which an optical sensor 420 is mounted. Light source 404 and light receiving element 408 are positioned on either side of an optical disk 412 mounted on a rotary shaft 410. Optical disk 412 is supported by a flange 414 around the shaft 410 and between the elements 404 and 408. Flange 414 has a diameter $D_{int}$, while a maximum optical disk 412 diameter is shown as y. $D_{ext}$ is greater than y, and y is greater than $D_{int}$. The refractive properties in accordance with embodiments of the present specification, provided by disk 412 are governed by the structure of disk 412, which is described in subsequent sections. Accordingly, the optical disk 412 allows light rays 406 to pass through the disk 412 so that a maximum footprint 418 of x distance is provided for elements 404 and 408. In embodiments, a ratio of a maximum value of y to $D_{ext}$ is approximately 95%; a ratio of a minimum value of y to $D_{int}$ is approximately 200%; a ratio of maximum footprint x to $D_{ext}$ is approximately 85%; and a ratio of $D_{int}$ to $D_{ext}$ is approximately 30%, which typically represents a diameter of $D_{ext}$, in an embodiment, of 40 millimeters (mm), which is the outside diameter of the angular sensor.

Figure 1:
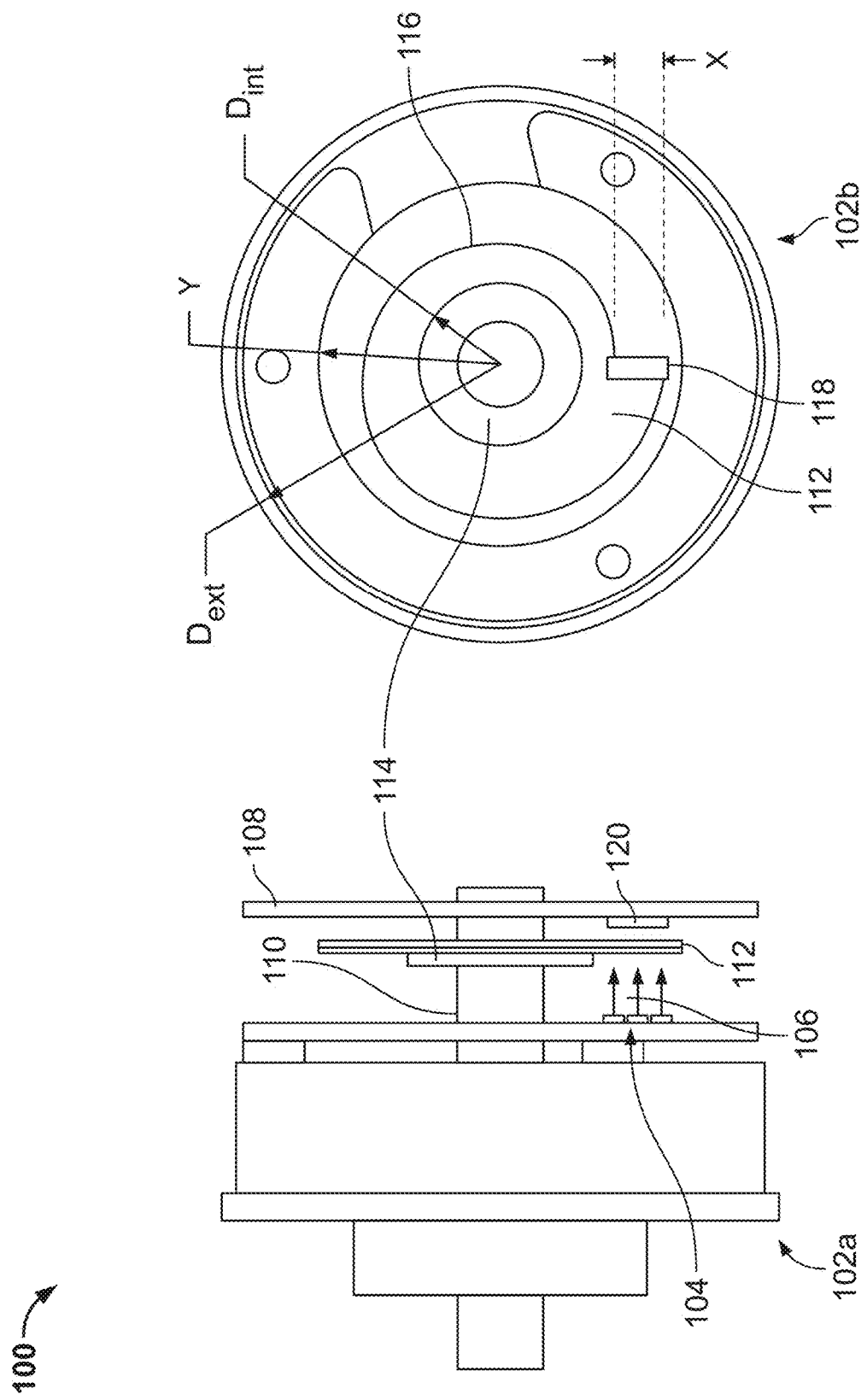
FIG. 1 illustrates an exemplary detector arrangement known in the prior art.

The maximum footprint x 418, in accordance with the embodiments of the present specification, is greater than the maximum footprint x 118 of conventional detector arrangements such as those described in FIG. 1. A position sensing detector 420 positioned on the element 408 detects the angular position of the rotary board, or angle of rotation thereof, from a light reception signal outputted by the detector 420 and processed by a signal processor, within the footprint 418 of x distance. In embodiments, the maximum footprint 418, unlike conventional systems, is not limited by $D_{int}$. The signal processor therefore generates a continuous light reception signal according to the position of light rays 406 on detector 420, indicating the angle of rotation of the optical disk 412.

Figure 5:
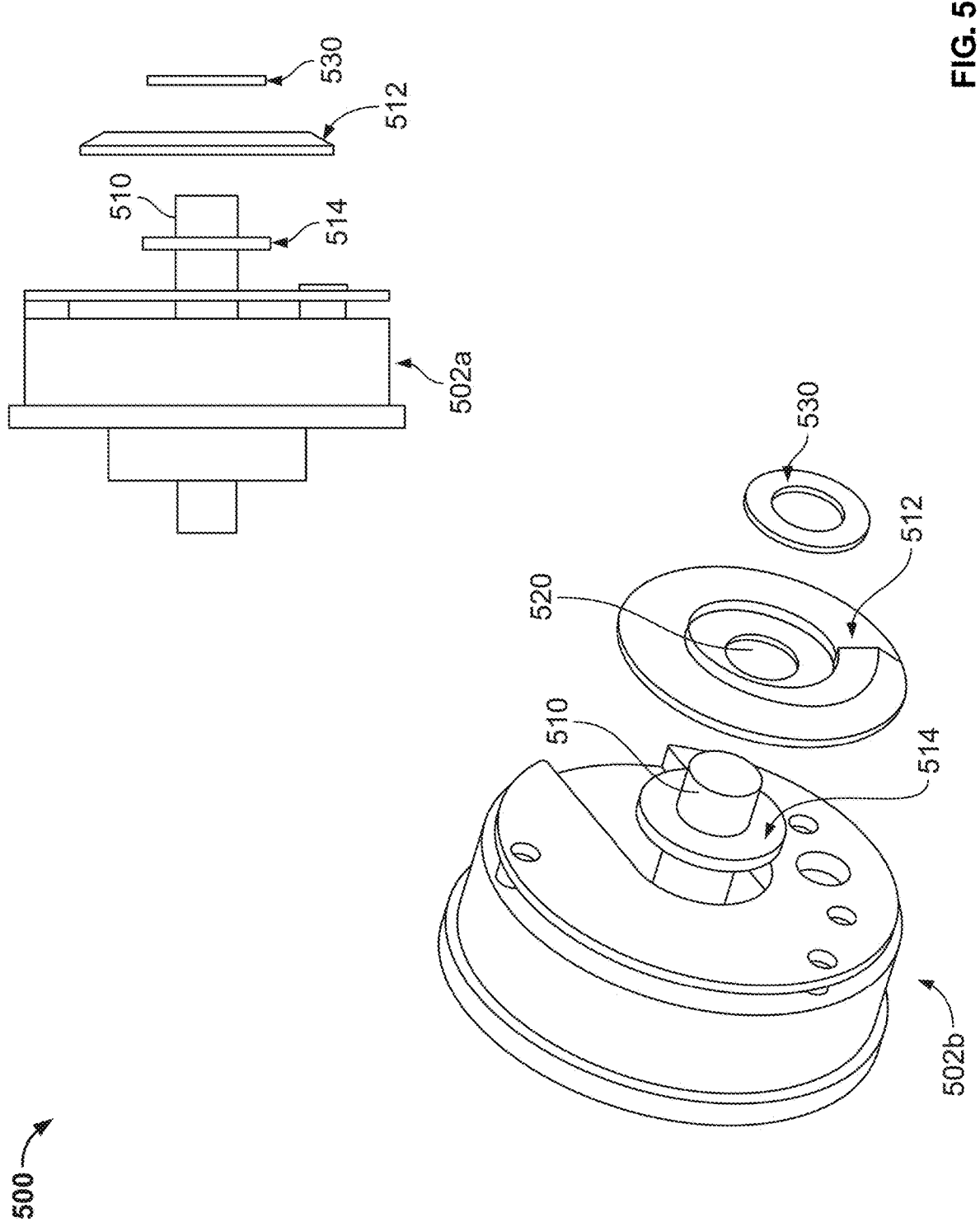
FIG. 5 illustrates an exemplary connection arrangement between an optical disk and a rotating member of a sensor to determine an angular position of a rotating assembly.

FIG. 5 illustrates an exemplary connection arrangement 500 between an optical disk 512 (or the rotating shaft assembly) and a rotating member 510 of a sensor to determine an angular position of a rotating assembly. The figure shows a break-away side elevation view 502a and a break-away front perspective view 502b of the connection arrangement 500. An optical disk 512 is positioned around a rotating member 510 with support from a flange 514. The rotating member 510 is a rotating shaft that is connected to the rotating assembly. A circular hole 520 at the center of the optical disk 512 may accommodate the flange 514. The flange 514 also includes a central hole or opening with a diameter that corresponds to diameter of the mounting hole 520 of the optical disk 512. A standard rotating member (shaft) 510 diameter may range from 5 millimetres (mm) to 10 mm. In some embodiments, the rotating member 510 has a diameter of one of 5 mm, 6 mm, or 8 mm. Further, the optical disk 512 is connected to the rotating member 510 with a retaining ring 530. The retaining ring 530 maintains the optical disk 512 in close contact with the rotating member 510 supporting flange 514. In some embodiments, the retaining ring 530 is in the form of a retaining disk or a clip that fastens the optical disk 512 to the rotating member 510. The retaining ring 530 is preferably made of steel. In some embodiments, ring 530 has an overall diameter of approximately 11.5 mm, and a thickness of approximately 0.254 mm. The flange 514 is pre-assembled (press-fitted) over the rotating member 510. The rotating member 510 is inserted into the optical disk 512 mounting center hole 520. The optical disk 512 is pushed until contact is made with the support flange 514. The retaining ring 530 is then pushed into place over disk 512.

FIG. 6A is a schematic diagram illustrating details of the optical disk 5 shown in FIG. 2, based on optical refractive principles, in accordance with some embodiments of the present specification. A top perspective view 5a and a side view 5b illustrate the geometry of an exemplary exit surface 12 of the optical disk 5. Referring simultaneously to FIGS. 2 and 6A, a circular hole 14 at the center of the disk 5 provides an opening for connecting the disk 5 to the rotating shaft 10. FIG. 5 illustrates and describes the connection between the optical disk 5 and the shaft 10. In embodiments, the first surface 11 (entry surface) of the optical transducer 5 is configured such that it is perpendicular to the incident rays 4, so that the incident rays 4 are refracted only at the second surface 12 (exit surface) of the optical disk 5. On the exit surface 12, the disk 5 is shaped in the form of a circular disk with a variable thickness that varies around the central axis of the disk. In other words, the plane of the exit surface 12 is configured at an angle relative to the entry surface 11. The angle at the exit surface 12 continuously varies, and is responsible for defining the position of the light spot 13 (FIG. 3) on the surface of the optical detector 7.

FIG. 6B illustrates another view of the optical disk 5 shown in FIG. 6A, in accordance with some embodiments of the present specification. The figure illustrates light rays 4 that are emitted from the light conditioner 3, are incident perpendicularly on the flat first entry surface 11 of the optical disk 5. Refracted rays 6 emerge from the exit surface 12 of the optical disk 5 at an angle relative to the entry surface 11. Refracted rays 6 from the exit surface 12 of the optical disk 5 create a light spot 13 (shown in FIG. 3) on surface of the optical detector 7. The angle of the exit surface 12 of the optical disk 5 is calculated to maximize optical detector 7 surface usage and to minimize optical detector 7 non-linearity. The sensor, in accordance with the present specification, exhibits nearly 100% accuracy of angular detection over the entire 360 degree range of rotation of the object being detected. Thus, the angle of the exit surface 12 of the optical disk 5 continuously changes to a value that provides a continuous linear displacement of the light spot 13 over the optical detector 7. The continuous linear displacement is proportional to the rotational position of the rotating shaft 10. For a known light spot 13 position on the detector 7 surface L (FIG. 8) and length x of detector 7, an optical disk rotation angle φ is derived as follows:

φ=optical disk rotation angle
x=length of detector
L =light spot travel distance on detector surface $$\varphi = (360 * L)/x$$

To maximize the L/φ ratio, a range of the optical disk exit surface angle (σ) of the exit surface 12 is selected to be between 0 and the critical internal reflection angle (approximately 41.8 degrees for plastic to air). If σ represents the angle of the exit surface 12 to the entry surface 11, at which the incoming light ray is refracted when exiting the exit surface 12 of the optical disk 5, then:

$$0 < \sigma < \sigma_{critical}$$

A distance D between surface of the detector 7 and optical disk 5, defines the maximum distance L travelled by light spot 13 on the surface of detector 7 for maximum value of σ.

FIG. 6A illustrates three regions: a first region 12a, a second region 12b, and a third region 12c, each having different angles relative to the perpendicular first entry surface 11 of the optical disk 5. The three regions 12a, 12b, and 12c, are described for illustrative purposes only. Embodiments of the optical disk 5 have a continuously variable angle at its exit surface 12, and not discreet regions with angles such as 12a, 12b, and 12c. In embodiments, region 12a has a maximum angle relative to the entry surface 11 and region 12c has a minimum angle relative to the entry surface 11. While FIGS. 6A and 6B illustrate an embodiment of optical disk 5 with a single refractive surface, in alternate embodiments, multiple refractive surfaces are incorporated.

Figure 6C:
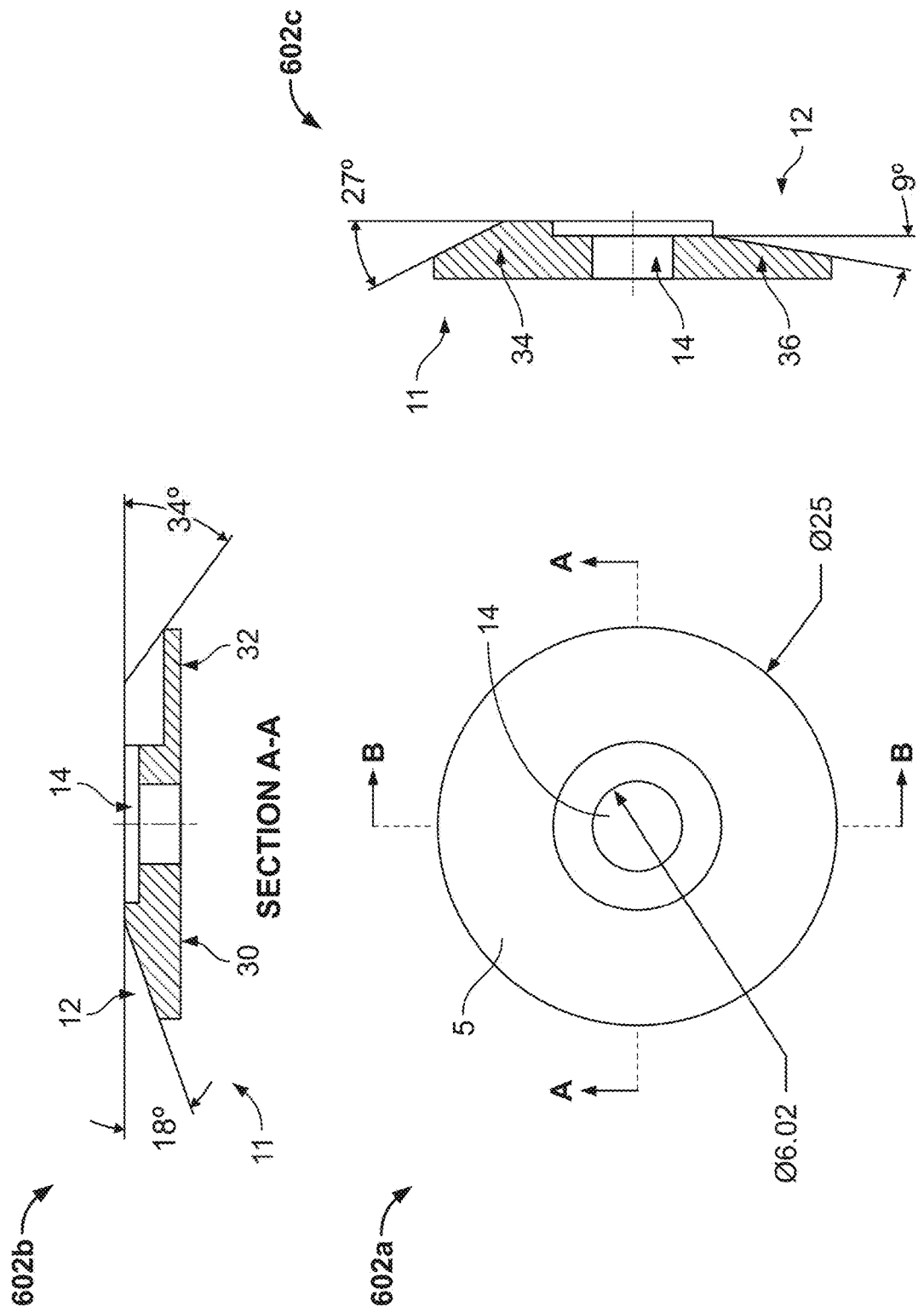
FIG. 6C illustrates additional views of the optical disk shown in FIGS. 6A and 6B, in accordance with some embodiments of the present specification.

FIG. 6C illustrates additional views of the optical disk 5 shown in FIGS. 6A and 6B, in accordance with some embodiments of the present specification. The figure shows a top view 602a, and two cross-sectional views 602b along a section A-A and 602c along a section B-B, respectively. A central point of the circular optical disk 5 lies at the center of the circular hole 14. In some embodiments, a diameter of the optical disk 5 is within a range of 15 mm to 30 mm. In one embodiment, the diameter of the disk 5 is 25 mm, and that of the hole 14 at its center is 6.02 mm. A diameter of 6.02 mm is, in an embodiment, configured to hold a rotating shaft of diameter of approximately 6.00 mm, where an additional 0.02 mm is allowed for clearance. Cross-section elevation view 602b of the disk 5 shows two regions of the disk 5 that are on either side of the hole 14. A bottom side of the disk 5 is flat and represents the entry surface 11, while the top side is at certain angles relative to the bottom side and represents the exit surface 12. A first region 30 on the exit surface 12 is raised at an angle of 18 degrees relative to the entry surface 11. A second region 32 on the exit surface 12 is raised at an angle of 34 degrees relative to the entry surface 11. Similarly, the cross-section elevation view 602c of the disk 5 shows two regions of the disk 5 that are on either side of the hole 14. A first region 34 on the exit surface 12 is raised at an angle of 27 degrees relative to the entry surface 11. A second region 36 on the exit surface 12 is raised at an angle of 9 degrees relative to the entry surface 11.

Figure 6D:
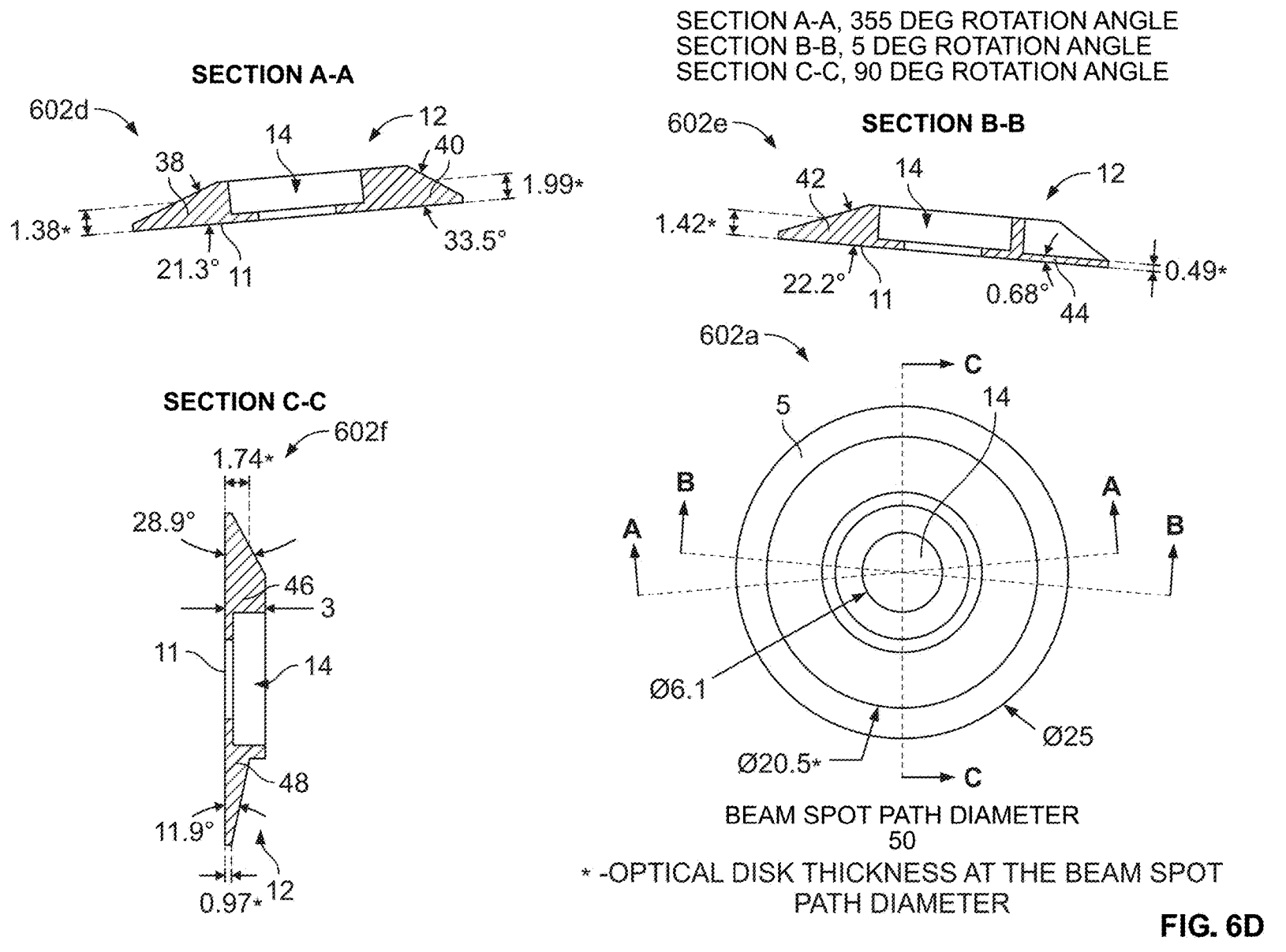

FIG. 6D illustrates additional views of the optical disk 5 shown in FIGS. 6A, 6B and 6C, in accordance with some embodiments of the present specification. The figure shows a top view 602a; a cross-sectional view 602d along a section A-A at 355 degrees rotation angle; a cross-sectional view 602e along a section B-B at 5 degrees rotation angle; and a cross-sectional view 602f along a section C-C at a 90 degree rotation angle. Referring to all views simultaneously, the central point of the circular optical disk 5 lies at the center of the circular hole 14. In one embodiment, the diameter of the disk 5 is 25 mm, and that of the hole 14 at its center is 6.1 mm. Cross-section elevation view 602d of the disk 5 shows two regions of the disk 5 that are on either side of the hole 14. A bottom side of the disk 5 is flat and represents the entry surface 11, while the top side is at varying angles relative to the bottom side and represents the exit surface 12. A first region 38 on the exit surface 12 is raised at an angle of 21.3 degrees relative to the entry surface 11. A second region 40 on the exit surface 12 is raised at an angle of 33.5 degrees relative to the entry surface 11. In some embodiments, a thickness of regions 38 and 40 at an exemplary beam path diameter 50 of 20.5 mm from the center of the optical disk 5 is 1.38 mm and 1.99 mm, respectively. The beam path diameter represents the path of the incident beam 4 traced on the circular entry surface 11 of optical disk 5. Similarly, the cross-section elevation view 602e of the disk 5 shows two regions of the disk 5 that are on either side of the hole 14. A first region 42 on the exit surface 12 is raised at an angle of 22.2 degrees relative to the entry surface 11 and has a thickness of 1.42 mm on beam path 50. A second region 44 on the exit surface 12 is raised at an angle of 0.68 degrees relative to the entry surface 11 and has a thickness of 0.49 mm on beam path 50. The cross-section elevation view 602f of the disk 5 shows two regions of the disk 5 that are on either side of the hole 14. A first region 46 on the exit surface 12 is raised at an angle of 28.9 degrees relative to the entry surface 11 and has a thickness of 1.74 mm on beam path 50. A second region 48 on the exit surface 12 is raised at an angle of 11.9 degrees relative to the entry surface 11 and has a thickness of 0.97 mm on beam path 50. It should be noted that the angles, thickness, and other numeric values are representative of various embodiments. These values may change for different configurations of devices in accordance with the present specification.

Figure 7:
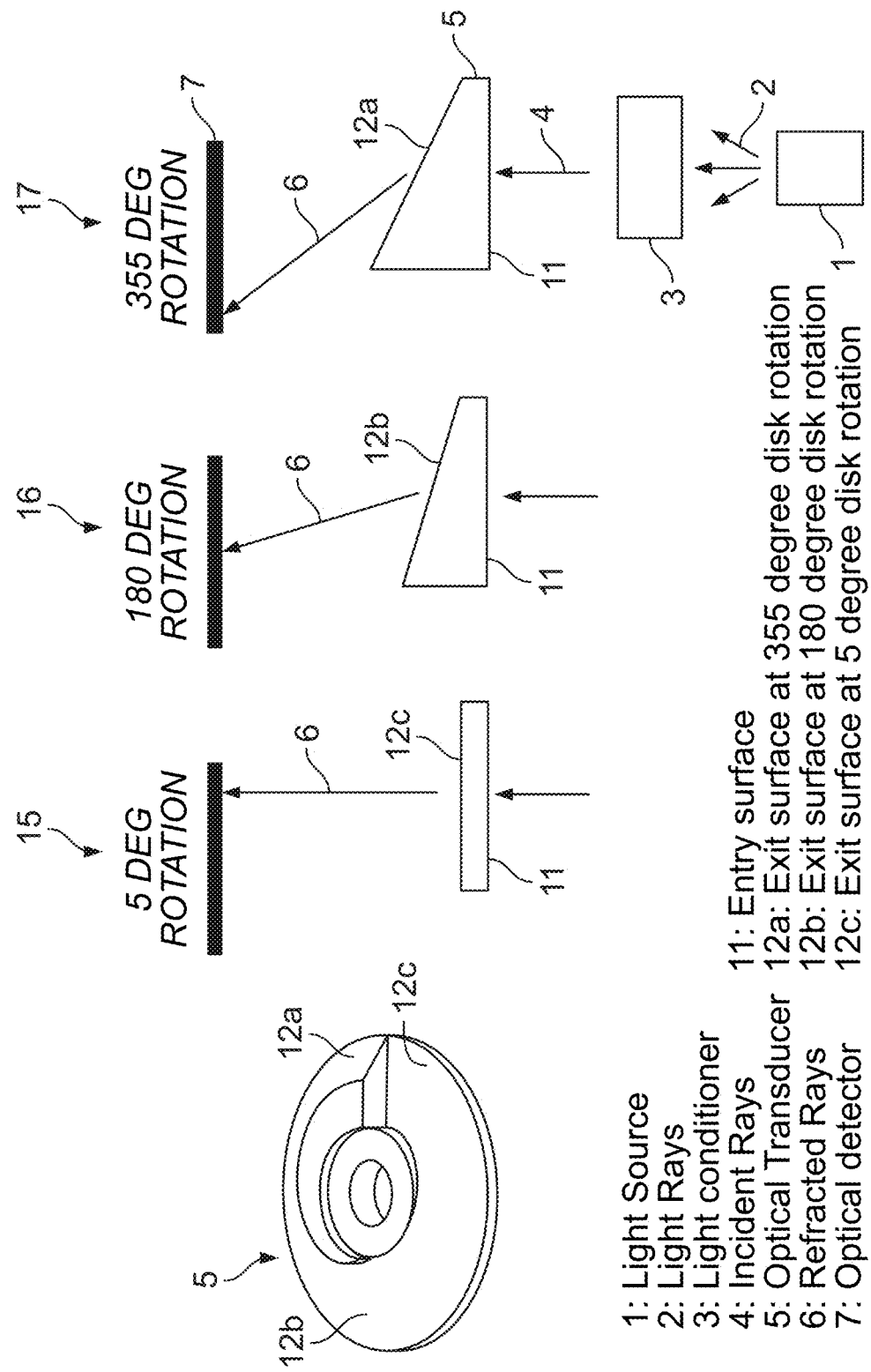
FIG. 7 is a schematic diagram illustrating the operation of the refractive optical transducer at different angles, in accordance with some embodiments of the present specification.

FIG. 7 is a schematic diagram illustrating the operation of the refractive optical transducer at different angles, in accordance with some embodiments of the present specification. Referring simultaneously to FIGS. 2, 6A, and 7, a view 15 illustrates the incident ray 4 that falls on the first entry surface 11 of the optical disk 5 that has rotated 5 degrees in conjunction with the shaft 10. Refracted ray 6 emerges from surface 12c in the form of a light spot on a first portion of the optical detector 7. A view 16 illustrates the incident ray 4 that falls on the first entry surface 11 of the optical disk 5 that has rotated 180 degrees with the shaft 10. Refracted ray 6 emerges from surface 12b in the form of a light spot on a second portion of the optical detector 7. A view 17 illustrates the incident ray 4 that falls on the first entry surface 11 of the optical disk 5 that has rotated 355 degrees with the shaft 10. Refracted ray 6 emerges from surface 12a in the form of a light spot on a third portion of the optical detector 7. The refracted ray 6 bends further with an increase in the angle of rotation of the optical disk 5 and with the varying thickness of the exit surface 12 of the optical detector. In embodiments, the refracted ray 6 emerges at a different angle, with the rotation of the optical disk 5, to trace a linear path on the optical detector 7, thereby achieving the linear "rotation to translation" function. The linear distance traced by the light spot on the optical detector 7 is proportional to the angular displacement of the rotating member.

Figure 8:
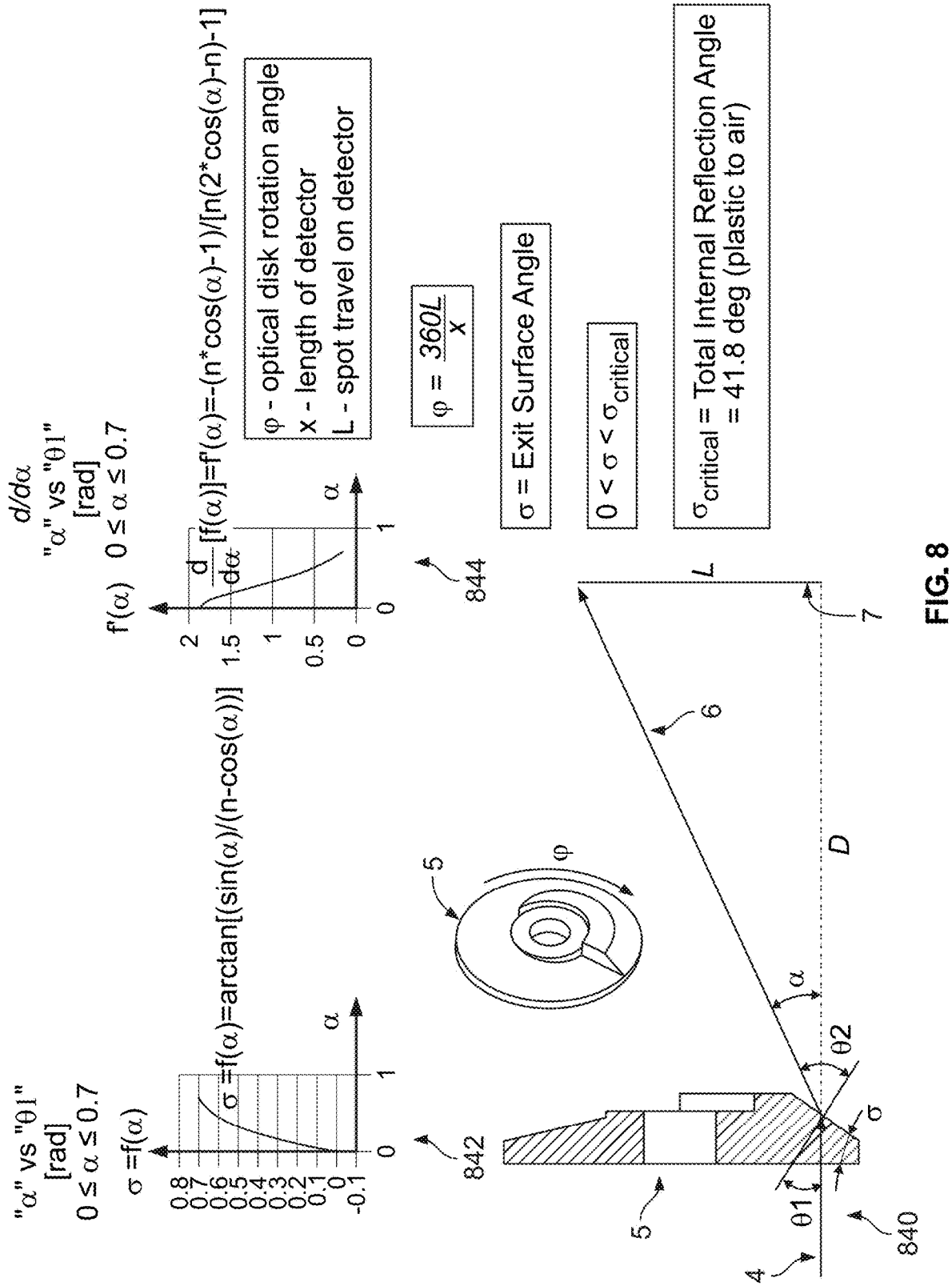
FIG. 8 illustrates a few graphs that show a correlation between an angle of rotation φ of the optical disk and a linear distance (L) travelled by a light spot on the detector, in accordance with some embodiments of the present specification.

In embodiments, for an optical disk such as disk 5, with entry surface 11 (which, in an embodiment is flat) and exit surface 12 (which, in an embodiment is angled), the optical disk 5 thickness is a critical parameter. FIG. 8 illustrates a few graphs that show a correlation between an angle of rotation (φ) of the optical disk 5 and a linear distance (L) travelled by a light spot on the detector 7, in accordance with some embodiments of the present specification. As noted previously, φ=optical disk rotation angle
x=length of detector
L=light spot travel distance on detector surface $\varphi = (360*L)/x$ σ=exit surface angle of the optical disk The refracted ray 6 exiting surface 12 emerges at an angle α (also termed as the light ray bend angle) relative to incident ray 4, which is directly related to a thickness of the optical disk 5 at the beam path diameter, is revolved over a full rotation of 360 degrees per the following equation:

$\sigma = f(\alpha)$ where α may also be termed as the bend angle.

The equation represents a linear relationship between angle of rotation (φ) and light spot travel distance (L) on the detector 7. Referring to FIG. 8, a graph 840 shows an incident ray 4 that falls on the entry surface 11 at an incident angle (relative to the normal of the optical disk exit surface 12) of $\theta_1$, and exits as ray 6 from the exit surface 12 at a refractive angle (relative to the normal of the optical disk exit surface 12) of $\theta_2$. In this case, the bend angle (α) is represented as:

$\alpha = \theta_2 - \theta_1$

The exit ray 6 travels a distance D before reaching the detector 7, and forms a light spot after bending to travel the distance L. A graph 842 illustrates a relationship between α and $\theta_1$ in radians. In graph 842, the relationship may be represented by the following equation:

$\sigma = f(\alpha) = \arctan[(\sin(\alpha)/(n - \cos(\alpha))]$

Figures 9A, 9B:
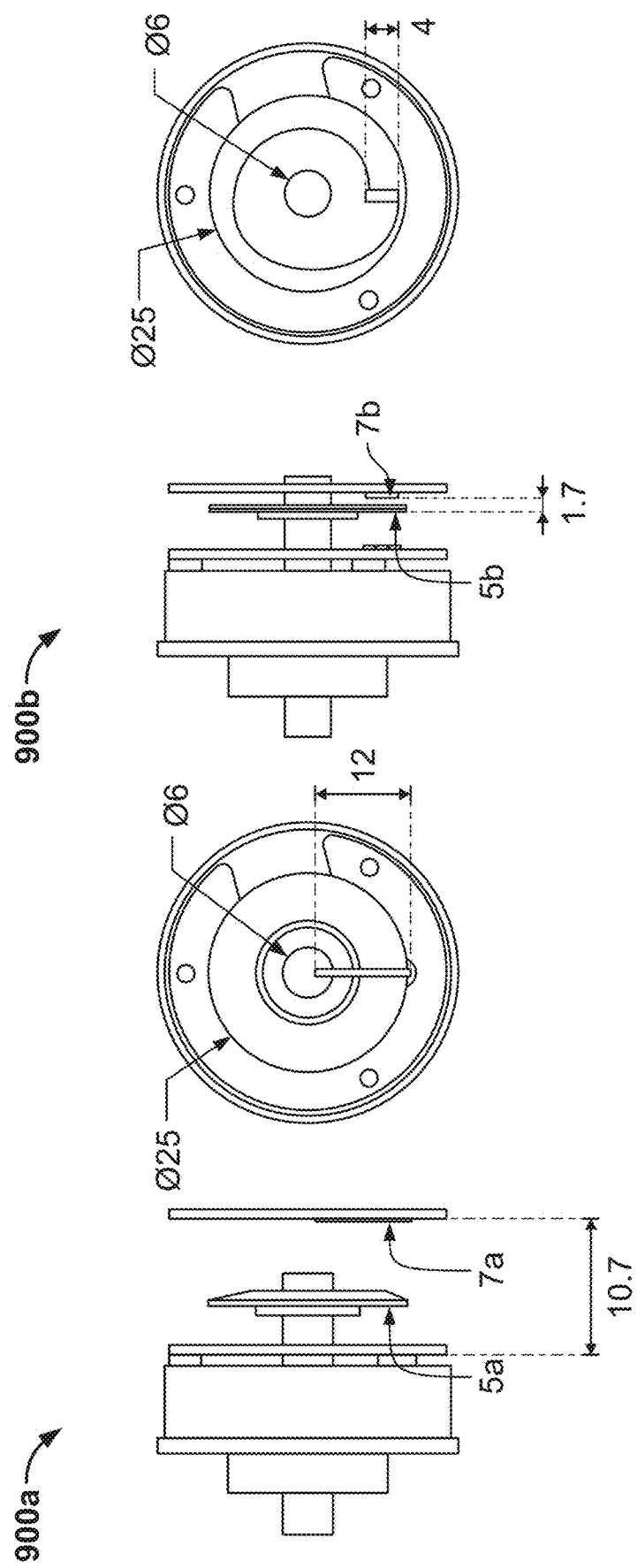
FIG. 9A illustrates one exemplary arrangement of an optical disk relative to a detector, in accordance with an embodiment of the present specification.
FIG. 9B illustrates a conventional arrangement of an optical disk relative to a detector.

A graph 844 illustrates a differential relationship between α and $\theta_1$ in radians. In graph 844, the relationship may be represented by the following equation:

$d/d\alpha[f(\alpha)] = f'(\alpha) = (n*\cos(\alpha)-1)/[n(2*\cos(\alpha)-n)-1]$ where, $n_1 \sin \theta_1 = n_2 \sin \theta_2$ $n_1$=index of refraction of disk material
$n_2$=index of refraction of air $\theta_1 = \sigma$ $0 \text{ rad} \leq \alpha \leq 0.43 \text{ rad}$ $\tan(\theta_2 - \theta_1) = L/D$ L=spot travel in mm
D=distance from optical disk 5 in mm Resolution is a function of the size of the detected spot and the distance that the detected spot can move. Conventional sensor systems require the light spot to cover 100% of the detector surface. A size of the light spot may correspond to a diameter of the light spot that is received by the optical detector 7. If the detected spot is large and does not move much, then there is not much movement to detect, and the resolution is therefore limited. If, however, the detected light spot is small and it can move over a wide range of distance, then the resolution is relatively improved. In embodiments, of the present specification, due to use of refractive optics the size of light spot is small and focused. FIG. 9A illustrates one exemplary arrangement 900a of an optical disk 5a relative to a detector 7a, in accordance with an embodiment of the present specification. FIG. 9B illustrates a conventional arrangement 900b of an optical disk 5b relative to a detector 7b. Both FIGS. 9A and 9B show a side view and a top view of the respective detector arrangements 900a and 900b. In some embodiments, a distance between the entry surface and the detector 7a surface is approximately 10.7 mm. Additionally, the detector 7a extends to a length of approximately 12 mm and has a width in a range of 1 to 2 mm. The detected light spot size is preferably smaller than a width of the detector 7. Further, in embodiments, the light spot can move much further than the diameter of the circular disk-shaped optical disk 5 (one can refract the light beyond the boundaries of the disk diameter), which may be approximately 25 mm. In conventional systems, a distance between the entry surface and the detector 7b surface is approximately 1.7 mm. Additionally, the detector 7b extends to a length of approximately 4 mm, for an optical disk 5b of the same diameter of 25 mm. The distance between the light source and the optical disk, the distance between the optical disk and the detector and the light shaping elements used in the light source define the light spot geometry on the detector surface. Therefore, the resolution that can be achieved by embodiments of the present specification are relatively improved over conventional optical sensors comprising the slit.

Figure 10:
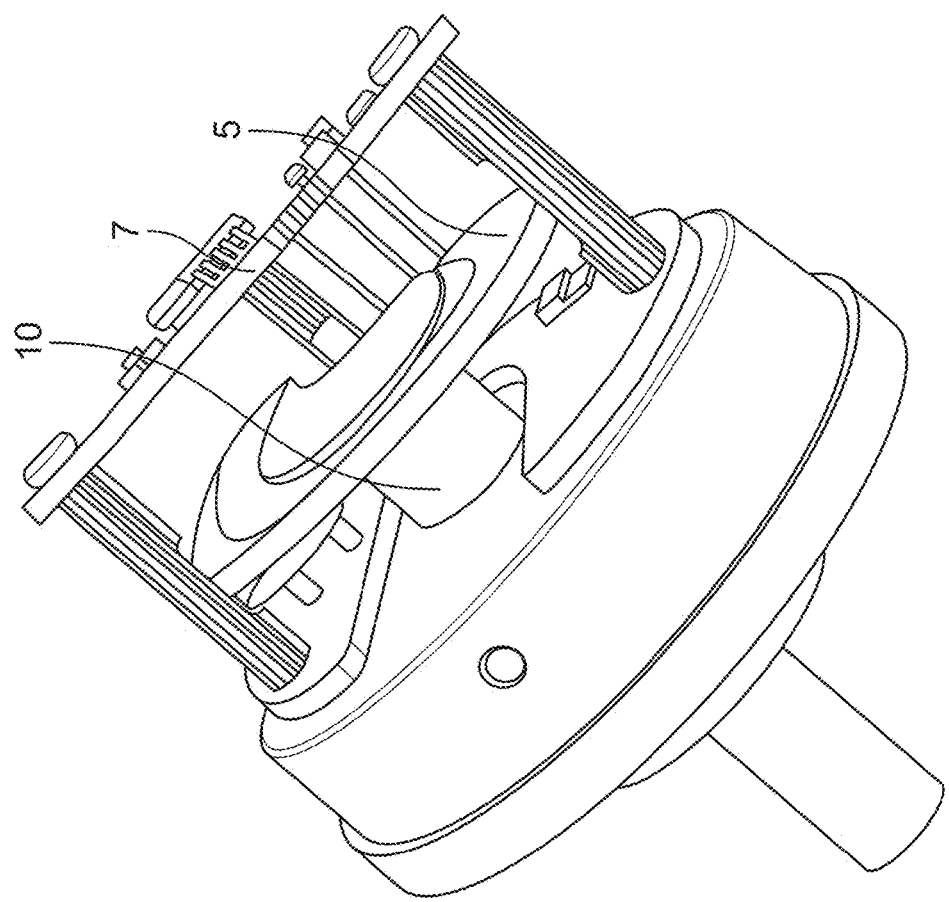
FIG. 10 illustrates an optical rotary sensor, in accordance with an embodiment of the present specification.

FIG. 10 illustrates an optical rotary sensor 1000, in accordance with an embodiment of the present specification. The figure illustrates the optical disk 5, optical detector 7, and rotating shaft 10.

Embodiments of the present specification provide a contact-less optical detection system that converts a mechanical shaft position to an analog voltage output that is ratio-metric to the angular shaft position. One of the advantages of using a contact-less sensor is the reduced wear and tear of components. The analog signal chain generated by the embodiments is continuous.

The above examples are merely illustrative of the many applications of the apparatus of present specification. Although only a few embodiments of the present invention have been described herein, it should be understood that the present specification might be embodied in many other specific forms without departing from the spirit or scope of the invention. Therefore, the present examples and embodiments are to be considered as illustrative and not restrictive, and the invention may be modified within the scope of the appended claims.

We claim:

1. An apparatus for detecting an angle of rotation of a rotating member, the apparatus comprising:
a light source for emitting light rays;
a light conditioner configured to receive and condition the light rays emitted by the light source in order to control an emission pattern of the light rays, wherein the light conditioner is further configured to emit the conditioned light rays;
an optical transducer with at least one refractive surface, wherein the optical transducer is coupled to the rotating member, wherein the optical transducer is configured to receive the conditioned light rays emitted by the light conditioner through its at least one refractive surface and to emit refracted rays in form of a light spot, and wherein the at least one refractive surface has a varying dimension that corresponds with the angle of rotation of the rotating member; and
an optical detector configured to receive the light spot emitted from the optical transducer, wherein the optical detector is configured to output an analog signal based on a position of the light spot and wherein the analog signal is indicative of the angle of rotation of the rotating member.

2. The apparatus of claim 1, wherein the at least one refractive surface comprises a first outer surface and a second outer surface and wherein the first outer surface is configured to receive the conditioned light rays and the second outer surface is configured to emit refracted light rays.

3. The apparatus of claim 2, wherein the first outer surface is perpendicular to a direction of travel of the received conditioned light rays.

4. The apparatus of claim 2, wherein the second outer surface is non-parallel to, and positioned opposite to, the first outer surface such that a volume between the first outer surface and second outer surface varies along a dimension of the at least one refractive surface.

5. The apparatus of claim 4, wherein the volume between the first outer surface and second outer surface varies around a circumference of the at least one refractive surface.

6. The apparatus of claim 4, wherein a varying thickness of the volume between the first outer surface and second outer surface defines a position of the light spot on the optical detector.

7. The apparatus of claim 4, wherein an angle of the second outer surface, relative to the first outer surface, changes continuously along a dimension of the at least one refractive surface such that, when impinged by the conditioned light rays, the at least one refractive surface causes a continuous linear displacement of the light spot on the optical detector.

8. The apparatus of claim 1 further comprising a light source drive circuitry.

9. The apparatus of claim 1 further comprising a signal circuitry in electrical communication with the optical detector, wherein the signal circuitry is configured to provide a continuous voltage output corresponding to the light spot received by the optical detector and wherein the voltage output is representative of the angular position of the rotating member.

10. The apparatus of claim 1 wherein the rotating member comprises a shaft assembly.

11. The apparatus of claim 1 wherein the optical detector is configured to not contact the optical transducer or rotating member.

12. The apparatus of claim 1 wherein the optical transducer is configured in a shape of a circular disk.

13. The apparatus of claim 1 wherein the light conditioner comprises at least one of refractive optics or optical apertures.

14. The apparatus of claim 1 wherein the light source comprises at least one of a point source light emitting diode (LED), a laser diode, or a vertical cavity surface emitting laser (VCSEL).

15. The apparatus of claim 1, wherein the optical transducer comprises a center and wherein the optical transducer is at attached its center to the rotating member.

16. The apparatus of claim 1, wherein the analog signal is continuous and ratio-metric to the angle of rotation of the rotating member.

17. The apparatus of claim 1, the at least one refractive surface has a varying thickness that corresponds with the angle of rotation of the rotating member.

18. The apparatus of claim 1, the at least one refractive surface has a varying width that corresponds with the angle of rotation of the rotating member.

19. The apparatus of claim 1, the at least one refractive surface has a varying material composition that corresponds with the angle of rotation of the rotating member.

20. An apparatus for detecting an angle of rotation of a rotating member, the apparatus comprising:
a light source for emitting light rays;

a light conditioner configured to receive and condition the light rays emitted by the light source in order to control an emission pattern of the light rays, wherein the light conditioner is further configured to emit the conditioned light rays;

an optical transducer with at least one refractive surface, wherein the optical transducer is coupled to the rotating member, wherein the optical transducer is configured to receive the conditioned light rays emitted by the light conditioner through its at least one refractive surface and to emit refracted rays in form of a light spot, and wherein the at least one refractive surface has a varying thickness that corresponds with the angle of rotation of the rotating member;

an optical detector configured to receive the light spot emitted from the optical transducer, wherein the optical detector is configured to output an analog signal based on a position of the light spot, wherein the analog signal is continuous and ratio-metric to the angle of rotation of the rotating member; and signal circuitry in electrical communication with the optical detector, wherein the signal circuitry is configured to provide a continuous voltage output corresponding to the light spot received by the optical detector and wherein the voltage output is representative of the angular position of the rotating member.

21. The apparatus of claim 20, wherein the optical detector is configured to not contact the optical transducer or rotating member.

22. The apparatus of claim 20, wherein the optical transducer is configured in a shape of a circular disk.

23. The apparatus of claim 20, wherein the light source comprises at least one of a point source light emitting diode (LED), a laser diode, or a vertical cavity surface emitting laser (VCSEL).

24. The apparatus of claim 20, wherein the optical transducer comprises a center and wherein the optical transducer is at attached its center to the rotating member.

* * * * *